United States Patent [19]

Fann et al.

[11] Patent Number: 5,392,512
[45] Date of Patent: Feb. 28, 1995

[54] METHOD FOR FABRICATING TWO-PIECE SCROLL MEMBERS BY DIECASTING

[75] Inventors: Yuan-Chang Fann; Bee-Yu Wei, both of Hsinchu; Jeng-Maw Chiou, Kaoshiung Hsien, all of Taiwan, Prov. of China

[73] Assignee: Industrial Technology Research Institute, Hsinchu, Taiwan, Prov. of China

[21] Appl. No.: 148,192

[22] Filed: Nov. 2, 1993

[51] Int. Cl.6 .............................................. B23P 15/00
[52] U.S. Cl. .................... 29/888.022; 418/55.2; 164/98; 164/103; 164/112; 164/113
[58] Field of Search .................. 29/888.022; 418/55.2; 164/98, 103, 105, 112, 113, 102

[56] References Cited

U.S. PATENT DOCUMENTS

| | | | |
|---|---|---|---|
| 4,403,494 | 9/1983 | McCullough | 72/360 |
| 4,456,051 | 6/1984 | Hukuhara | 164/137 |
| 4,487,248 | 12/1984 | Fukushima et al. | 164/137 |
| 4,512,066 | 4/1985 | McCullough | 29/23.5 |
| 4,615,091 | 10/1986 | Niwa et al. | 29/888.022 |
| 4,627,800 | 12/1986 | Matsudaira et al. | 418/55 |
| 4,696,084 | 9/1987 | Hirano et al. | 29/888.022 |
| 4,802,831 | 2/1989 | Suefuji et al. | 418/55 |
| 4,838,936 | 6/1989 | Akechi | 75/249 |
| 5,044,904 | 9/1991 | Richardson, Jr. | 418/55.2 |
| 5,051,079 | 9/1991 | Richardson, Jr. | 418/55.2 |

FOREIGN PATENT DOCUMENTS

| | | | |
|---|---|---|---|
| 57-135291 | 8/1982 | Japan | 29/888.022 |
| 0151341 | 6/1990 | Japan | 29/888.022 |

*Primary Examiner*—Irene Cuda
*Attorney, Agent, or Firm*—W. Wayne Liauh

[57] ABSTRACT

A two-step two-piece high-pressure casting process for the fabrication of a scroll member containing a generally circular end plate, a scroll hub on one side of the end plate and an involute wrap on the other side thereof. The involute wrap is pre-fabricated from a wear-resistant alloy or aluminum alloy based composite having low liquidus temperature which is placed inside the involute groove of a scroll mold. The scroll mold contains a mobile scroll mold and a stationary scroll mold. The mobile scroll mold contains a first cavity having the shape of the scroll hub; whereas the stationary scroll mold contains a second cavity having the shape of the circular end plate and an involute groove disposed below the second cavity. A molten aluminum alloy or aluminum alloy based composite is injected into the first and second mold cavities which, after solidifies, becomes the scroll hub and the end plate is respective positions whereby a metallurgical bonding will be developed between the end plate and the involute wrap to ensure the integrity of the scroll member. The involute groove has a depth shorter than the height of the involute wrap to increase the area of metallurgical bonding between the end plate and the involute wrap.

15 Claims, 2 Drawing Sheets

METHOD FOR FABRICATING TWO-PIECE SCROLL MEMBERS BY DIECASTING

FIELD OF THE INVENTION

This invention relates generally to a scroll-type fluid displacement device having intermeshing fixed and orbiting scroll members, wherein each scroll member comprises a separate involute wrap element connected to a generally circular end plate. More particularly, this invention relates to an improved method for fabricating two-piece scroll members that are light-weight, highly abrasion-resistant, exhibit excellent dimensionally stability, and possess the same structural integrity as one-piece scroll members. Furthermore, the present invention discloses a method which involves easy assembly, requires low production cost, facilitates mass production, and is most advantageous for the fabrication of orbiting scroll members.

BACKGROUND OF THE INVENTION

Scroll-type fluid displacement devices which are generally known as scroll pumps, compressors, and expanders, is well know in the art. In U.S. Pat. No. 801,182, issued to Creus, it is disclosed the basic construction of a scroll type fluid displacement apparatus which comprises a pair of scrolls each having a circular end plate and a spiroidal or "involute" spiral element. The scrolls are maintained angularly and radially offset with respect to each other so that both spiral elements interfit to form a plurality of line contacts between their spirally curved surfaces to thereby seal off and define at least one pair of fluid pockets. The relative orbital motions the two scrolls shifts the line contacts along the spirally curved surfaces and change the volume of the fluid between the spiral elements. Scroll type fluid displacement apparatus may be used to compress, expand or pump fluids.

One of the most common applications of scroll type fluid displacement apparatus is for use as refrigerant compressors in refrigerators and/or all conditioning units. In a typical scroll-type refrigerant compressor, which comprises an orbiting scroll member and a stationary scroll member, refrigerant gas is taken into fluid pockets formed at the outer most end of the spiral element. Due to the orbital motion of the orbiting scroll member, the fluid pockets are gradually compressed as they are moved toward the center of the spiral elements. Finally, when compressed fluid reaches the central portion of the interfitting spiral elements, the compressed fluid is discharged to an external fluid circuit and exits the system.

The scroll-type compressor potentially has the advantages of offering quiet, efficient, and low-maintenance operation in a variety of refrigeration applications application. However, several design and manufacturing problems have persisted since the inception of the scroll-type compressors which have hindered the scroll compressors from achieving the wide market acceptance and commercial success as expected. Some of the more notable problems include the difficulty and high cost of fabricating the fixed and orbiting scroll members. These problems make it less competitive against other types of compressors such as reciprocating piston and rotary vane type compressors.

There are two basic constructional alternatives for fabricating scroll members, namely, the single-piece process which involves forming the end plate and the involute wrap as an integral member (e.g., by machining out the involute wrap), or the two-piece process which involves forming the involute wrap and the end plate separately and then joining them into a finished scroll member. The single-piece process provides superior mechanical integrity of the scroll members. However, fabricating an integrally formed scroll member using the single-piece process requires excessive amounts of time and man-power; it also generates large quantities of waste metal. Several methods which involve the steps of forming separate pieces then joining the involute wrap and the end plate together have been proposed; however, none appears to have proven economic feasibility or satisfy many of the stringent technical and precision requirements of modern day refrigerant compressors, such as high precision, dimensional stability, and abrasion resistance, to name a few.

U.S. Pat. No. 4,403,494 discloses a method and apparatus for forming scroll members containing an end plate and an involute wrap rigidly affixed to the end plate. In the method disclosed in the '494 patent, the end plate and the involute wrap are precision formed by casting either as an integral element or as two separate elements and then the scroll member is coined to the desired dimensional accuracy. This procedure is applicable only to those wrap metals having sufficient ductility to permit it to be precisely coined to the desired configuration. The requirement for good ductility often causes surface resistivity (particularly resistance to abrasion) to be compromised. To ameliorate this weakness, it was suggested that an additional step be provided which involves temporarily masking the flank surfaces of the wrap and then treating the end plate surface by hard anodization or by hard chrome plating.

U.S. Pat. No. 5,051,079 discloses a scroll-type hermetic compressor having a fixed scroll member assembly and an orbiting scroll member assembly within a hermetically sealed housing. Each of the fixed and orbiting scroll member assemblies includes a separately formed scroll wrap member interconnected with a plate member. The wrap member is affixed to the plate member by the retention of the axial end thereof within a matching involute channel in the plate member by a welded joint, a sintered joint, a press fit, or an interference fit. The wrap member is disposed within the channel such that the axial end surface thereof is essentially flush with the back surface of the plate member. The plate member of the fixed scroll member assembly is mounted to a frame member, and the plate member of the orbiting scroll member assembly is mounted to a drive hub member.

U.S. Pat. No. 4,627,800 discloses a scroll type fluid displacement compressor with spiral wrap elements of varying thickness. The fluid displacement compressor includes a pair of scrolls each having a circular end plate and a spiral element extending therefrom. The scrolls are maintained at an angular and radial offset so that the two spiral (i.e., wrap) elements interfit so as to form a plurality of line contacts which define at least one pair of sealed off fluid pockets. Upon relative orbital motions of the scrolls, the line contacts shift along the spirally curved surfaces of the spiral elements to change the volume of the fluid pockets. In the scroll type fluid displacement compressor disclosed in the '800 patent, the thickness of the spiral element of the orbiting scroll is gradually reduced from the inner end of the spiral element to its outer end to increase the mechanical strength of the spiral element at its central portion. The thickness of the spiral element of the fixed scroll is, on the other hand, gradually increased from the inner end of the spiral element to its outer end to compensate for the change in the shape of the facing spiral element of the orbiting scroll.

U.S. Pat. No. 4,838,936 discloses a method for making forged aluminum alloy spiral parts, such as orbiting and fixed scroll plates having involute wraps, for use in making scroll compressors. This method includes the steps of first forming a preform (green compact) from aluminum alloy powder, such as Al-20Si, Al-35Si, etc., having fine and homogeneous microstructures as raw material by compressing with a die assembly and cold isostatic pressing. Then the aluminum alloy preform is hot-forged to produce the spiral parts.

U.S. Pat. No. 4,512,066 discloses a method for fabricating scroll members comprising the steps of (1) forming a precision pre-formed scroll member having an involute wrap affixed to an end plate; the inner and outer flanks of the involute wrap are joined to the end plate along the base of the involute wrap; (2) forming re-entrant corners between the surface of the end plate and the inner and outer flank surfaces; and (3) broaching the inner and outer flanks of the involute wrap axially toward the surface of the end plate to attain a pre-determined thickness of the involute wrap and a radial spacing between the turns thereof. The re-entrant corners provide clearance for chips resulting from the broaching step. In the process disclosed by the '066 patent, the pre-formed scroll member is formed as an integral element containing both the involute wrap and the end plate by die casting.

U.S. Pat. No. 5,044,904 discloses a hermetically sealed compressor having a fixed scroll member assembly and an orbiting scroll member assembly within a hermetically sealed housing. Each of the fixed and orbiting scroll member assemblies includes a separately formed scroll wrap member interconnected with a plate member by means of a plurality of interconnecting pin members received within corresponding axial bores in the wrap member and the plate member. The plate member of the fixed scroll member assembly is mounted to a frame member, and the plate member of the orbiting scroll member assembly is mounted to a drive hub member operably coupled to a crankshaft. In the scroll member assembly disclosed in the '904 patent, the interconnecting pin members fit loosely within the bores in the wrap member such that the wrap member is movable with respect to the plate member thereby providing radial compliance between the fixed and orbiting scroll member assemblies during compressing operations.

U.S. Pat. No. 4,802,831 discloses a compressor comprising stationary and orbiting scroll members. The stationary and orbiting scroll members are formed thereon with spiral wraps engaged with each other to define compression chambers which, when the orbiting scroll member is moved relative to the stationary scroll member, are radially inwardly moved which decreasing their volumes. Each scroll member is composed of a metallic base scroll member and a spiral wrap formed on one side of the metallic base scroll member. The surface of the metallic base member and the spiral wrap are provided with a coating layer of a resin composition. The resin composition comprises a thermosetting resin and an inorganic filler and has a linear thermal expansion coefficient of not greater than $2.8 \times 10^{-5}$ cm/cm/°C. and a glass transition temperature of not lower than 160° C.

SUMMARY OF THE INVENTION

Having discussed the potential advantages of scroll-type compressors and the drawbacks of prior art methods for fabricating the same, the primary object of the present invention is, therefore, to develop an improved method which can cost-effectively fabricate scroll members, in particular, orbiting scroll members, for use in the scroll-type compressors which are light-weight, low-cost, abrasion-resistant, and with excellent dimensional stability. More particularly, the present invention discloses a two-stage method for fabricating two-piece scroll members by a high pressure casting technique. The method disclosed in the present invention is the fruit of many years of dedicated research effort by the co-inventors and it is also most suitable for the mass production of improved orbiting scroll members. One of the advantages of the method disclosed in the present invention is that the orbiting scroll member can be made from a wide variety of materials to ensure optimum performance, including light-weight materials.

The present invention relates to a scroll type fluid displacement apparatus which comprises a pair of scroll members, an orbiting scroll member and a stationary scroll member, each having a generally circular end plate and an involute warp. The involute wrap is a spiroidal or "involute" spiral element having a pre-determined thickness and height connected to and extending from one side of the end plate. The scroll members are maintained angularly and radially offset with respect to each other so that both involute wraps interfit to form a plurality of line contacts between their spirally curved surfaces to thereby seal off and define at least one pair of fluid pockets. The relative orbital motions of the two scrolls shift the line contacts along the spirally curved surfaces and change the volume of the fluid between the spiral elements. The scroll type fluid displacement apparatus of the present invention may be used in compressors, expanders or fluid pumps. The method disclosed in the present invention is particularly advantageous for the fabrication of orbiting scroll members, because of the lightweight requirement in order to avoid excessive energy consumption. However, the present invention can be used equally advantageously for the fabrication of stationary scroll members.

In the method disclosed in the present invention, an involute wrap is first pre-fabricated using casting, forging, extrusion, metal injection molding, powder metallurgy, or any other appropriate technique, or combination thereof, from an appropriate first alloy. The prefabricated involute wrap preferably should have precisely its final dimension to avoid excessive machining after the final scroll member is made. The involute wrap is preferably made from abrasion-resistant and low thermal expansion coefficient material, such as aluminum-silicon alloys, or aluminum-based composites containing ceramic particles, silicon carbide particles, and/or ceramic fibers. Examples of preferred materials for making the involute wrap include $2014/Al_2O_3$, $A356/SiC$, and $A336/Al_2O_3$ composites, etc.

It is further preferred that the pre-fabricated involute wrap be made from alloys having relatively low liquidus temperature. An example of the alloys having relatively low liquidus temperature includes eutectic Al-Si alloy based composites, such as $A336/Al_2O_3$ aluminum alloy composite. The A336 alloy has a silicon content of about 11–13 wt %; it has a favorably low thermal expansion coefficient of $22 \times 10^{-6}/°C$. and high abrasion resistance. Cast iron also has a low thermal expansion coefficient and relatively abrasion resistance; however, because of its relatively heavy weight (three times as heavy as the aluminum alloy), cast iron is not a suitable material for fabricating orbiting scroll members. The orbiting and the stationary scroll members should preferably be made from metals having comparable thermal expansion coefficients to thereby achieve the desired hermetically sealed condition. The A390 alloy has a silicon content of 16–17 wt %, and a thermal expansion coefficient of $19 \times 10^{-6}/°C$., a value comparable to that of the A336 alloy. Table 1 lists the composition of some of the preferred aluminum alloys for fabricating the scroll members using the method disclosed in the present invention.

After the involute wrap is pre-fabricated, it is placed inside, a scroll mold having a mold cavity, which is constructed as a negative complement of the shape, in all three dimensions of the final scroll member to be made. The scroll mold comprises an mobile scroll mold and a stationary scroll mold. The mobile scroll mold contains a first cavity which has the shape of the scroll hub-which is often referred to as the drive hub. The stationary scroll mold contains a second cavity, which has the shape of the end plate, and an involute groove having a similar shape and dimension as those of the involute wrap. The involute groove is preferably less deep than the height of the involute wrap but should be slightly wider. During the fabrication of the two-piece scroll member according to the method disclosed in the present invention, the involute wrap is placed inside the involute groove and a portion of the height of the involute wrap will protrude above the involute groove due to the height difference. After the scroll mold is closed by pressing the mobile scroll mold against the stationary scroll mold, a molten alloy is injected into the scroll mold cavity via an injection port using a piston at an appropriate injection pressure. The molten alloy can be the same as or different from the first alloy constituting the pre-fabricated involute. However, the molten alloy to be injected should preferably be able to develop metallurgical bonding with the pre-fabricated involute. Suitable molten alloys for the injection include hypereutectic Al-Si alloys and aluminum-based composites. It is preferred that these alloy materials could ultimately provide the required hermetical sealing, high mechanical strength, abrasion-resistance, and low thermal expansion coefficient.

Typically the molten alloy will be injected at temperatures between 760° and 850° C. If an eutectic Al-Si alloy (such as A336 aluminum alloy) based composite, which has a liquidus temperature of about 565° C., is used in making the pre-fabricated involute wrap, there will be a favorable temperature difference of about 200°~290° C. Most of other non-eutectic aluminum alloys have liquidus temperatures exceeding 600° C. The difference between the temperature of the injected molten alloy and the liquidus temperature of the involute wrap could dictate the success or failure of the process disclosed in the present invention. If the temperature difference is not large enough, metallurgical bonding may not develop between the involute wrap and the end plate. It is desirable to inject the molten alloy below 850° C. In addition to processing concerns, too high a temperature could also result in the formation of hydrogen bubbles, which should be avoided.

The process disclosed in the present invention can be summarized as comprising the following steps:

1. Prefabricating an involute wrap having a predetermined thickness and height.

2. Obtaining a scroll mold comprising a mobile scroll mold and a stationary scroll mold; the mobile scroll mold has a first cavity having the shape of the scroll hub and the stationary scroll mold has a second cavity and an involute groove below the second cavity; the second cavity having the shape of the generally circular end plate and the involute groove having a recessed dimension corresponding to the shape and dimension of the involute wrap, except that the depth of the involute groove is preferably less than the height of the involute wrap and its width is slightly wider than the thickness of the involute wrap. Collectively, the first cavity and the second cavity form the overall scroll mold cavity.

3. Pre-heating the scroll mold to 200°~300° C. It may be desirable to apply a mold releasing agent on the surface of the scold mold cavity.

4. Pre-heating the pre-fabricated involute wrap to about 200°~450° C. and placing the pre-fabricated involute wrap into the involute groove of the stationary scroll mold. Because the pre-fabricated involute wrap is only slightly narrower than the width of the involute groove, it will be tightly but removably placed inside the involute groove. It may be desirable to apply a coating of a flux composition on the surface of the involute wrap to facilitate the melting of the surface layer thereof the involute wrap and thus promote the metallurgical bonding between the involute wrap and a molten alloy to be brought in contact therewith.

5. Placing a molten alloy at about 760°~850° C. into the injectant feeder.

6. Pressing the mobile mold against the stationary scroll mold and closing the scroll mold. The molten alloy is then injected into the scroll mold cavity from the injectant feeder using a piston at an appropriate pressure (typically about 107 MPa). At this time, the surface layer of the involute wrap in contact with the injected molten alloy will be melted and mixed therewith to eventually form a metallurgical bonding when the molten alloy solidifies. Since a portion of the involute wrap protrudes from the involute groove, a metallurgical bonding is developed over an extended area which greatly enhances the integrity of the scroll member fabricated using the process of the present invention. Preferably, the molten alloy is injected at a relatively high injection pressure. One of the benefits that may be realized using the high pressure casting process is that the liquidus point of the alloys will be lowered thus helping promoting the development of metallurgical bonding therebetween.

7. After the molten alloy solidifies, opening the scroll mold and removing the scroll member from the scroll mold.

The scroll member prepared above may be heat treated at 350°~400° C. for 4 hours, and then cooled in a furnace or in air to room temperature. A finishing step can be applied on the final scroll member to ensure smooth surface and the exact dimension.

BRIEF DESCRIPTION OF THE DRAWINGS

The present invention will be described in detail with reference to drawings showing the preferred embodiment of the present invention, wherein.

DETAILED DESCRIPTION OF PREFERRED EMBODIMENT

The present invention will now be described more specifically with reference to the following examples. It is to be noted that the following descriptions of examples including preferred embodiments of this invention are presented herein for purpose of illustration and description; it is not intended to be exhaustive or to limit the invention to the precise form disclosed.

Figure 2:
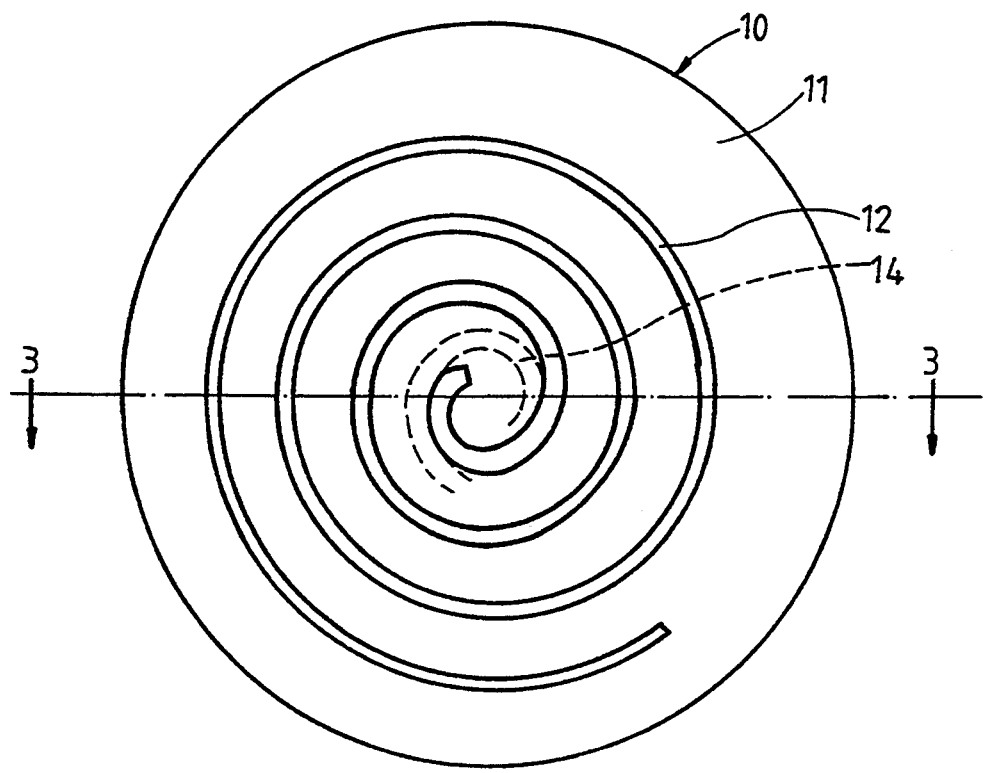
FIG. 2 is a top view of the scroll member showing the involute wrap on top of the end plate; the dashed line shows a portion of the involute wrap in a intermeshing scroll member.
Figure 3:
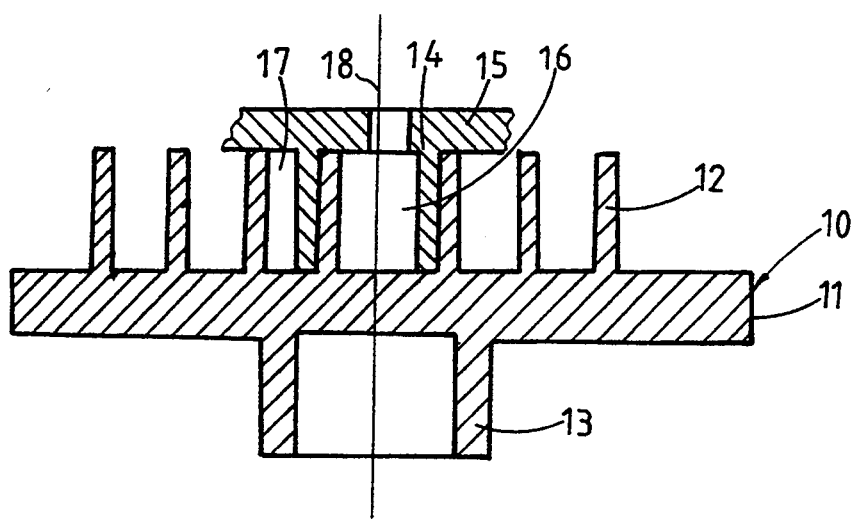
FIG. 3 is a vertical cross-sectional view along line AA of the scroll member shown in FIG. 2, with the partial cross-section view of the interfitting scroll member.

Now referring to the drawings, the present invention relates to a scroll type fluid displacement apparatus comprising a pair of scroll members, an orbiting scroll member and a stationary scroll member, each having a generally circular end plate and an involute wrap. The method disclosed in the present invention is particularly advantageous for the fabrication of orbiting scroll members, which, as shown in FIG. 2, contain an end plate 11, a relatively short cylindrical scroll hub 13 on one side of the end plate 11, and an involute wrap 12 on the other side thereof. The pair of orbiting and stationary scroll members are maintained angularly and radially offset with respect to each other so that both involute wraps interfit to form a plurality of line contacts between their spirally curved surfaces to thereby seal off and define at least one pair of fluid pockets. The relative orbital motions of the two scrolls shift the line contacts along the spirally curved surfaces and change the volume of the fluid between the spiral elements. FIG. 2 is a top view of an orbiting scroll member 10, with an end plate 11 and an involute wrap 12. The orbiting scroll member is interfitted with a stationary scroll member, whose involute wrap is partially shown as the dashed object 14. FIG. 3 is a cross-sectional view of the orbiting scroll member 10, taken along line 3—3. FIG. 3 show the end plate 11, involute wrap 12, and scroll hub 13 of the orbiting scroll member 10. FIG. 3 also shows a portion of the involute 14 and end plate 15 of an interfitting stationary scroll member, as well as the fluid pockets 16, 17 formed between the orbiting scroll member and the stationary scroll member. As the involute wrap 12 orbits about the central axis 18, the volume of fluid pockets 16 and 17 will be reduced, thus causing the fluid contained therewithin to be compressed.

Figure 1:
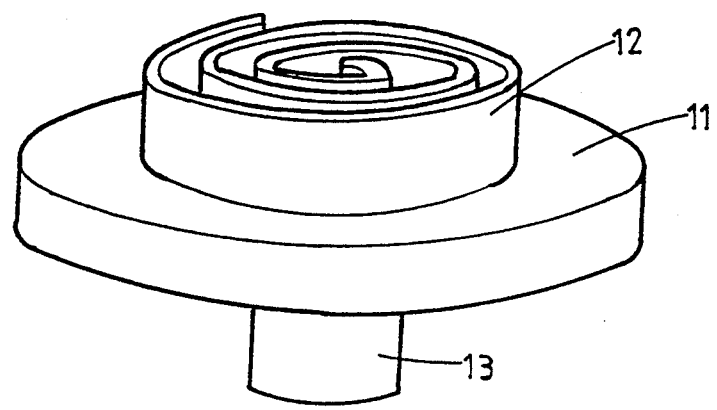
FIG. 1 is a perspective view of the scroll member.
Figure 4:
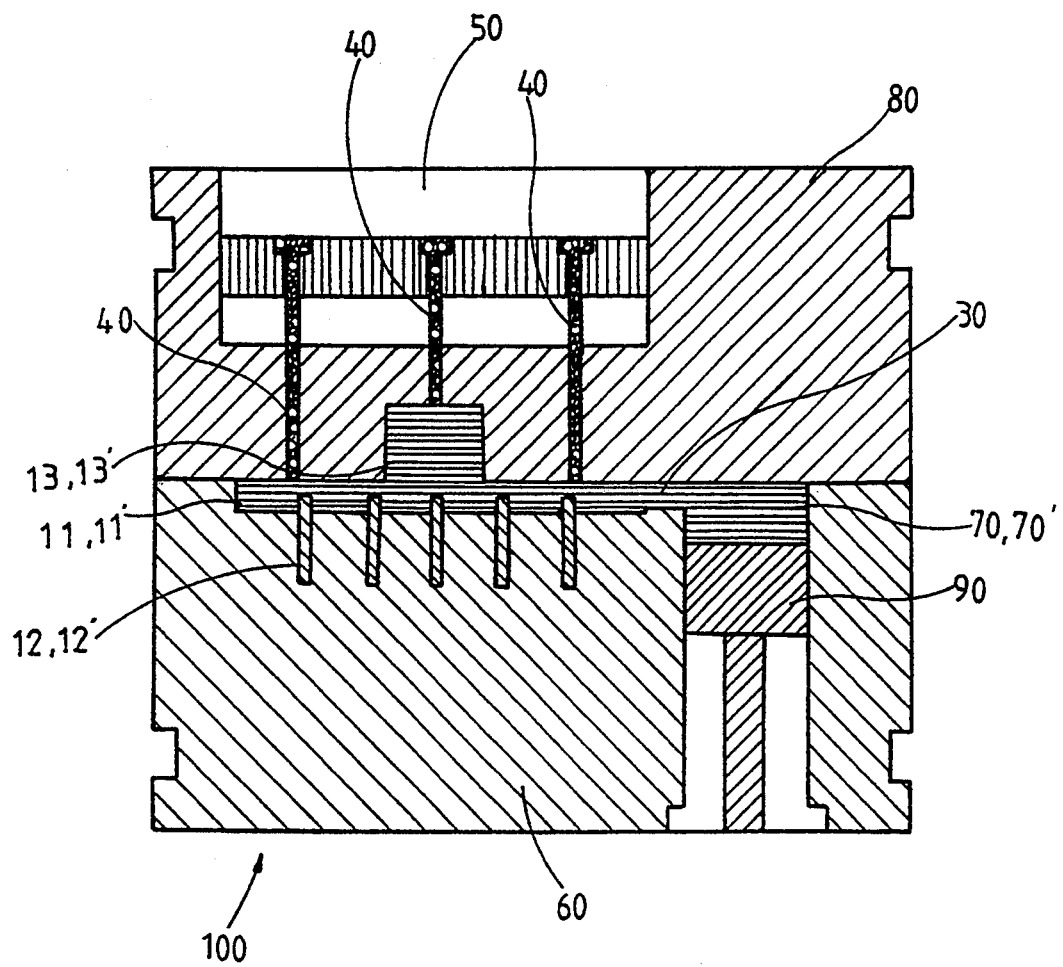
FIG. 4 is a schematic diagram showing the process of the present invention utilizing a scroll mold.

FIG. 4 is a cross-sectional view of the scroll mold that was constructed for fabricating scroll members using the high pressure casting process disclosed in the present invention. The scroll mold comprises a mobile scroll mold 80 and a stationary scroll mold 60. The mobile scroll mold 80 contains a first cavity 13' having the shape of the hub 13. The stationary scroll mold 60 contains a second cavity 11' having the shape of the end plate 11, and an involute groove 12' having the dimension and shape of the involute wrap 12. The involute groove 12' has a depth that is shorter than the height of the involute wrap 12 so as to promote enhanced metallurgical bonding between the involute wrap 12 and the end plate 11. The involute groove 12' also has a width that is only very slightly wider than the thickness of the involute wrap 12, to allow the insertion of the involute wrap but ensure that the molten alloy will not enter the involute groove 12'.

After the pre-fabricated involute wrap 12 was prepared, the scroll mold was pre-heated to about 220° C. A coating layer of an appropriate release agent was spray-coated on the surface of the second cavity 11' and the involute groove 12' of the lower scroll mold 60. The pre-fabricated involute wrap 12 was made from an aluminum-based composite containing A336 and 8 volume % $Al_2O_3$. The prefabricated involute wrap was heated to 450° C. before it was placed inside the involute groove. If desirable, the surface of the pre-fabricated involute wrap may be coated with an appropriate flux composition so that the surface layer of the involute wrap will melt more readily.

A molten aluminum-silicon alloy (Al-22 wt % Si) 70 at a temperature of 780° C. was charged into an injectant feeder 70' in the stationary scroll mold 60. After the mobile and stationary scroll molds were closed together, molten aluminum-silicon alloy was injected from the injectant feeder through the injection port 30 into the second cavity using a piston at a pressure of 107 MPa, until the molten alloy filled the first cavity 11' and the second cavity 12'. After the injection of the molten alloy, the surface layer of the protruded portion of the involute wrap was heated and melted which was then mixed with the molten alloy to form an integral body. The mobile scroll mold is provided with a plurality of push-rods 40 which can be lowered to touch the top surfaces of the scroll hub 13 and the end plate 11, so as to allow gas bubbles in the molten alloy to escape through the clearance between the push-rods and the holes 40'.

After the alloy was solidified the scroll mold was opened by lifting the mobile mold. The involute wrap can be easily separated from the involute groove. The scroll member thus fabricated was then pushed off from the mobile scroll mold using the push-rods 40. The scroll member was heated at 350°~400° C. for four hours and cooled in the furnace to room temperature. After the scroll member was cooled, some finishing steps were applied to obtain the final product.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

TABLE 1

| Composition (wt %) of 2014/$Al_2O_3$ (10 Vol % $Al_2O_3$ particles): | | | | | | | | | |
|---|---|---|---|---|---|---|---|---|---|
| Si | Fe | Cu | Mn | Mg | Cr | Zn | Ti | All Others | Al |
| 0.5~1.2 | 0.7 max | 3.9~5.0 | 0.4~1.2 | 0.2~0.8 | 0.1 max | 0.25 max | 0.15 max | 0.15 | balance |

TABLE 1-continued

| Composition (wt %) of 6061/Al$_2$O$_3$ (15 vol % Al$_2$O$_3$ particles): | | | | | | | | | |
|---|---|---|---|---|---|---|---|---|---|
| Si | Fe | Cu | Mn | Mg | Cr | Zn | Ti | All Others | Al |
| 0.4~0.8 | 0.7 max | 0.15~0.4 | 0.15 max | 0.8~1.2 | 0.04~0.34 | 0.25 max | 0.15 max | 0.05~0.15 | balance |
| Composition (wt %) of A356/SiC (20 vol % SiC particles): | | | | | | | | | |
| Si | Fe | Cu | Mn | Mg | Cr | Zn | Ti | | Al |
| 6.5~7.5 | 0.11 | 0.1 | 0.05 | 0.3~0.4 | | 0.05 | 0.2 | | balance |
| Composition (wt %) of A336/Al$_2$O$_3$ (8 vol % Al$_2$O$_3$ fibers): | | | | | | | | | |
| Si | Fe | Cu | Mn | Mg | Cr | Zn | Ti | Ni | Al |
| 11.7 | 0.32 | 1.24 | 0.04 | 1.22 | 0.03 | 0.04 | 0.04 | 1.33 | balance |
| Composition (wt %) of A359: | | | | | | | | | |
| Si | Fe | Cu | Mn | Mg | Ni | Zn | Ti | All Others | Al |
| 8.5~9.5 | 0.2 max | 0.2 max | 0.1 max | 0.45~0.65 | 0.2 max | 0.05 max | 0.2 max | 0.03~0.1 | balance |
| Composition (wt %) of A380: | | | | | | | | | |
| Si | Fe | Cu | Mn | Mg | Ni | Zn | Ti | All Others | Al |
| 9.5~10.5 | 0.8~1.2 | 3.0~3.5 | 0.5~0.8 | 0.3~0.5 | 0.2 max | 0.05 max | 0.2 max | 0.03~0.1 | balance |

What is claimed is:

1. A process for fabricating a scroll member for use in a scroll-type fluid displacement device, said scroll member comprising an end plate, an involute wrap on one side thereof and a scroll hub on the other side, said wrap having a pre-determined height and a pre-determined thickness, said process comprising the steps of:
   (a) obtaining a scroll mold comprising a mobile scroll mold and a stationary scroll mold, said mobile scroll mold containing a first mold cavity having the shape of said scroll hub, said stationary scroll mold containing an injection port, a second cavity and an involute groove disposed below said second cavity, said second cavity having the shape of said end plate, said involute groove having the shape of the involute wrap, and said injection port is connected to an injectant feeder;
   (b) pre-fabricating an involute wrap;
   (c) placing said prefabricated involute wrap from step (b) inside said involute groove;
   (d) injecting a molten alloy composition from said injectant feeder into said second cavity until it fills said first and second cavities to form said scroll member; and
   (e) cooling said scroll member and removing it from said scroll mold.

2. The process for fabricating a scroll member according to claim 1 wherein said involute groove has a depth which is shorter then the height of said involute wrap and a width which is slightly wider than the thickness of said involute wrap.

3. The process for fabricating a scroll member according to claim 1 wherein said pre-fabricated involute wrap was made from aluminum alloys or aluminum alloy based composites.

4. The process for fabricating a scroll member according to claim 3 wherein said aluminum ahoy based composites are composite materials containing aluminum ahoy and ceramic particles, silicon carbide particles, or ceramic fibers.

5. The process for fabricating a scroll member according to claim 3 wherein said aluminum ahoy based composites are 2014/Al$_2$O$_3$, A356/SIC, or A336/Al$_2$O$_3$.

6. The process for fabricating It scroll member according to claim 1 wherein said molten alloy composition is selected from the group consisting of hypereutectic aluminum-silicon alloys and aluminum alloy based composites.

7. The process for fabricating a scroll member according to claim 6 wherein said aluminum alloy based composites are composite materials of aluminum alloy and ceramic particles, silicon carbide particles, or ceramic fibers.

8. The process for fabricating a scroll member according to claim 6 wherein said aluminum alloy based composites are 2014/Al$_2$O$_3$, A356/SIC, or A336/Al$_2$O$_3$.

9. The process for fabricating a scroll member according to claim 1 which further comprises the step of pre-heating said scroll mold to temperatures of about 200° to 300° C.

10. The process for fabricating a scroll member according to claim 1 which further comprises the step of pre-heating said pre-fabricated involute wrap to temperatures of about 200° to 450° C.

11. The process for fabricating a scroll member according to claim 1 wherein said pre-fabricated involute wrap is made from an aluminum ahoy or aluminum ahoy based composite having a liquidus temperature lower than 650° C.

12. The process for fabricating a scroll member according to claim 1 wherein said molten alloy is injected at a temperature between 760° and 850° C.

13. The process for fabricating a scroll member according to claim 1 wherein said molten alloy is injected at a pressure above 100 Mpa.

14. The process for fabricating a scroll member according to claim 1 wherein said pre-fabricated involute wrap was made by casting, forging, extrusion, metal injection molding, or powder metallurgy process, or combination thereof.

15. The process for fabricating a scroll member according to claim 1 wherein said end plate and said involute wrap are connected by metallurgical bonding.

* * * * *